(12) United States Patent
Tsujikawa

(10) Patent No.: US 11,314,034 B2
(45) Date of Patent: Apr. 26, 2022

(54) IMAGING APPARATUS

(71) Applicant: FUJITSU FRONTECH LIMITED, Tokyo (JP)

(72) Inventor: Akinori Tsujikawa, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 104 days.

(21) Appl. No.: 16/924,479

(22) Filed: Jul. 9, 2020

(65) Prior Publication Data
US 2020/0341227 A1    Oct. 29, 2020

Related U.S. Application Data

(63) Continuation of application No. PCT/JP2018/003590, filed on Feb. 2, 2018.

(51) Int. Cl.
*G02B 7/02* (2021.01)
*G03B 17/12* (2021.01)
*H04N 5/225* (2006.01)

(52) U.S. Cl.
CPC ............. *G02B 7/02* (2013.01); *G03B 17/12* (2013.01); *H04N 5/2254* (2013.01)

(58) Field of Classification Search
CPC .......... G02B 7/02; G03B 15/05; G03B 17/02; G03B 17/12; G03B 2215/0567; G03B 2215/0575; G06K 2009/00932; G06K 9/00885; G06K 9/209; H04N 5/2254; H04N 5/2256

See application file for complete search history.

(56) References Cited

U.S. PATENT DOCUMENTS

2011/0075021 A1* 3/2011 Chang .................... G02B 7/025
                                                                          348/374
2015/0241730 A1* 8/2015 Kondoh ................. H04N 5/655
                                                                          348/794
(Continued)

FOREIGN PATENT DOCUMENTS

CN         102036004 A      4/2011
CN         105072998 A      11/2015
(Continued)

OTHER PUBLICATIONS

Office action issued in corresponding Chinese patent application No. 201880086903.2, dated Apr. 19, 2021.
(Continued)

*Primary Examiner* — Amy R Hsu
(74) *Attorney, Agent, or Firm* — Greer Burns & Crain Ltd.

(57) ABSTRACT

An imaging apparatus includes: a wiring board; an imaging unit that includes a lens module and an imaging element mounted on the wiring board; a housing that assumes a frame shape and includes an opening in the direction of an optical axis of the imaging unit; a top cover placed over the housing; a light source that emits light to travel to the outside through the top cover; and a light guide body that surrounds the lens module and guides the light emitted from the light source, wherein the imaging unit is spaced apart from the top cover by a space, the housing includes a bulging section bulging toward the lens module without being in contact the wiring board, and the bulging section receives a load applied from the top cover via at least the light guide body.

2 Claims, 3 Drawing Sheets

(56) References Cited

U.S. PATENT DOCUMENTS

| | | | |
|---|---|---|---|
| 2016/0014308 A1* | 1/2016 | Yamazaki | G06V 40/1312 348/77 |
| 2016/0044215 A1 | 2/2016 | Tsujikawa | |
| 2019/0101680 A1 | 4/2019 | Tsujikawa | |
| 2020/0341227 A1* | 10/2020 | Tsujikawa | H04N 5/2254 |

FOREIGN PATENT DOCUMENTS

| | | |
|---|---|---|
| EP | 3001671 A1 | 3/2016 |
| EP | 3006998 A1 | 4/2016 |
| JP | 5057968 U | 7/1993 |
| JP | 59056683 B2 | 6/2016 |
| JP | 2017163296 A | 9/2017 |
| WO | 2014196044 A1 | 12/2014 |
| WO | 2017216902 A1 | 12/2017 |

OTHER PUBLICATIONS

EESR issued in corresponding European patent application No. EP 18 90 3834.2, dated Jul. 9, 2021.

ISR issued in Int'l. Application No. PCT/JP2018/003590, dated May 1, 2018.

\* cited by examiner

IMAGING APPARATUS

CROSS-REFERENCE TO RELATED APPLICATION

This application is continuation application of International Application PCT/JP2018/003590 filed on Feb. 2, 2018 and designated the U.S., the entire contents of which are incorporated herein by reference.

FIELD

The aspects described herein are related to an imaging apparatus.

BACKGROUND

Conventionally, an imaging apparatus that includes an imaging element disposed on a wiring board and a lens unit for focusing light on the imaging element has been used for a biometrics authentication apparatus that performs authentication based on biological information such as palm or finger veins, fingerprints, or pupil irises.

As such an imaging apparatus, an imaging apparatus has been proposed wherein the outer edges of a top cover having a rectangular plate shape are supported by a housing having a rectangular frame shape so as to prevent a load applied to the top cover from being applied to a wiring board via a member such as a lens module (see, for example, Japanese Patent No. 5956683).

SUMMARY

In an aspect, an imaging apparatus includes: a wiring board; an imaging unit that includes a lens module and an imaging element mounted on the wiring board; a housing that assumes a frame shape and includes an opening in the optical-axis direction of the imaging unit; a top cover placed over the housing; alight source that emits light to travel to the outside through the top cover; and a light guide body that surrounds the lens module and guides the light emitted from the light source, wherein the imaging unit is spaced apart from the top cover by a space, the housing includes a bulging section bulging toward the lens module without being in contact the wiring board, and the bulging section receives a load applied from the top cover via at least the light guide body.

The object and advantages of the invention will be realized by means of the elements and combinations particularly pointed out in the claims.

DESCRIPTION OF EMBODIMENTS

Figure 1:
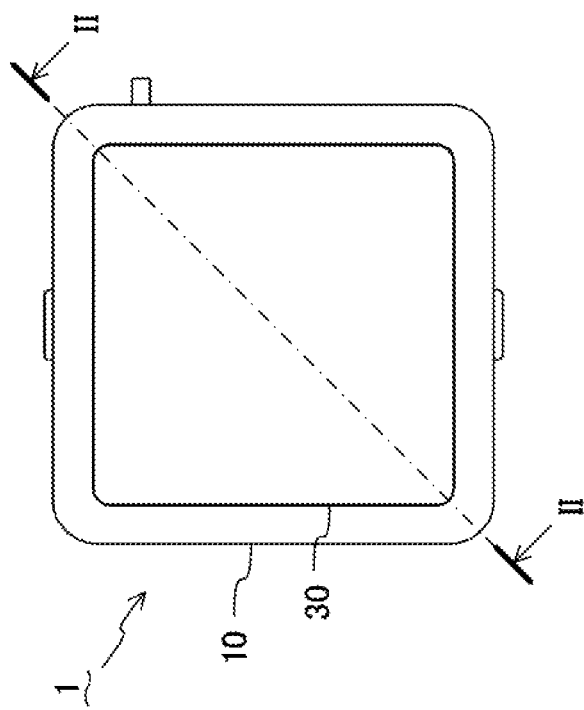
FIG. 1 is a plan view illustrating an imaging apparatus in accordance with embodiments.

In the meantime, a lens module is surrounded by a ring-shaped light guide body that diffuses light emitted from an illumination light emitting element toward a subject and a ring-shaped light blocking body that blocks light rays such as that emitted from the illumination light emitting element and leaked from the spaces between components within the imaging apparatus.

Regarding an imaging apparatus wherein the outer edge of a top cover is supported by a housing as described above, a load applied to the imaging apparatus due to the top cover being pressed by, for example, a finger will be applied to the housing at the outer edge of the top cover, which is located outward of a light guide body and a light blocking body.

However, warping of the top cover due to application of a load to the center thereof could bring the top cover into contact with the lens module. The top cover being brought into contact with the lens module causes a load to be transferred to the wiring board via the lens module, thereby warping the wiring board. Since minute components such as a central processing unit (CPU) and a memory are mounted on the wiring board, the warping of the wiring board could break the components mounted on the wiring board.

The lens module and the top cover may be prevented from coming into contact with each other by widening the space therebetween. However, the thickness of the imaging apparatus will be increased by the amount of widening of the space, thereby upsizing the imaging apparatus.

Whether adopting a configuration in which a load applied to the center of the top cover is transferred from the light guide body or the light blocking body directly to the wiring board or a configuration in which a load applied to the top cover is indirectly transferred from the light guide body or the light blocking body indirectly to the wiring board via the lens module, the components mounted on the wiring board could be broken due to warping of the wiring board, as described above.

The following describes an imaging apparatus 1 in accordance with embodiments by referring to the drawings.

Figure 2:
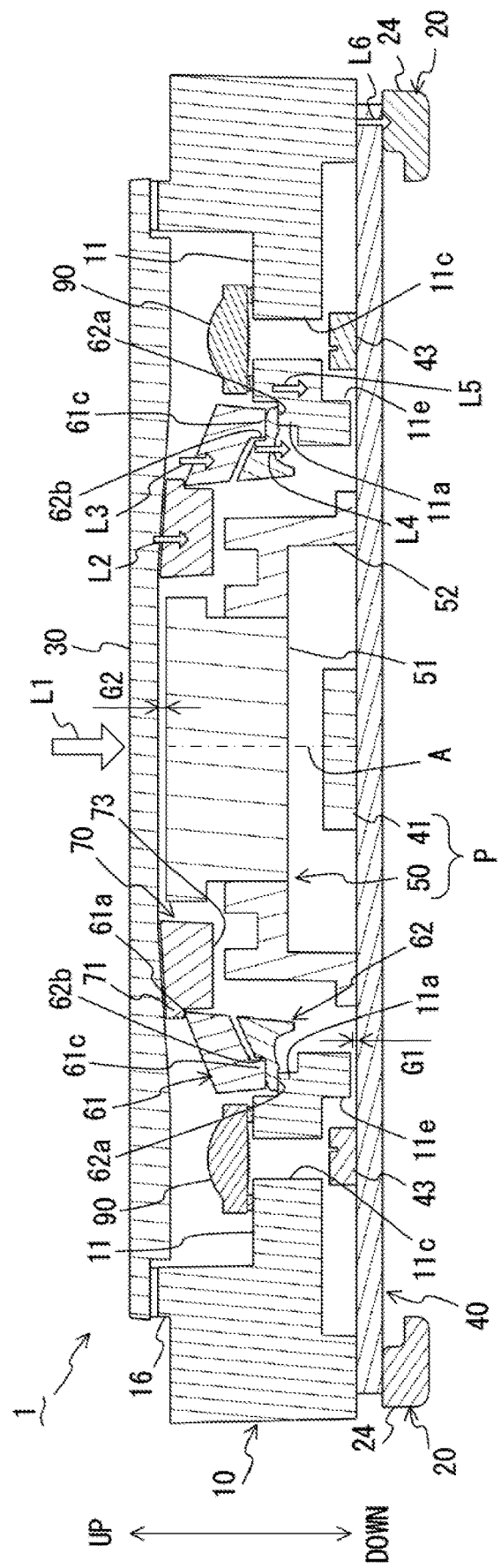
FIG. 2 is an enlarged II-II cross-sectional view of FIG. 1.
Figure 3:
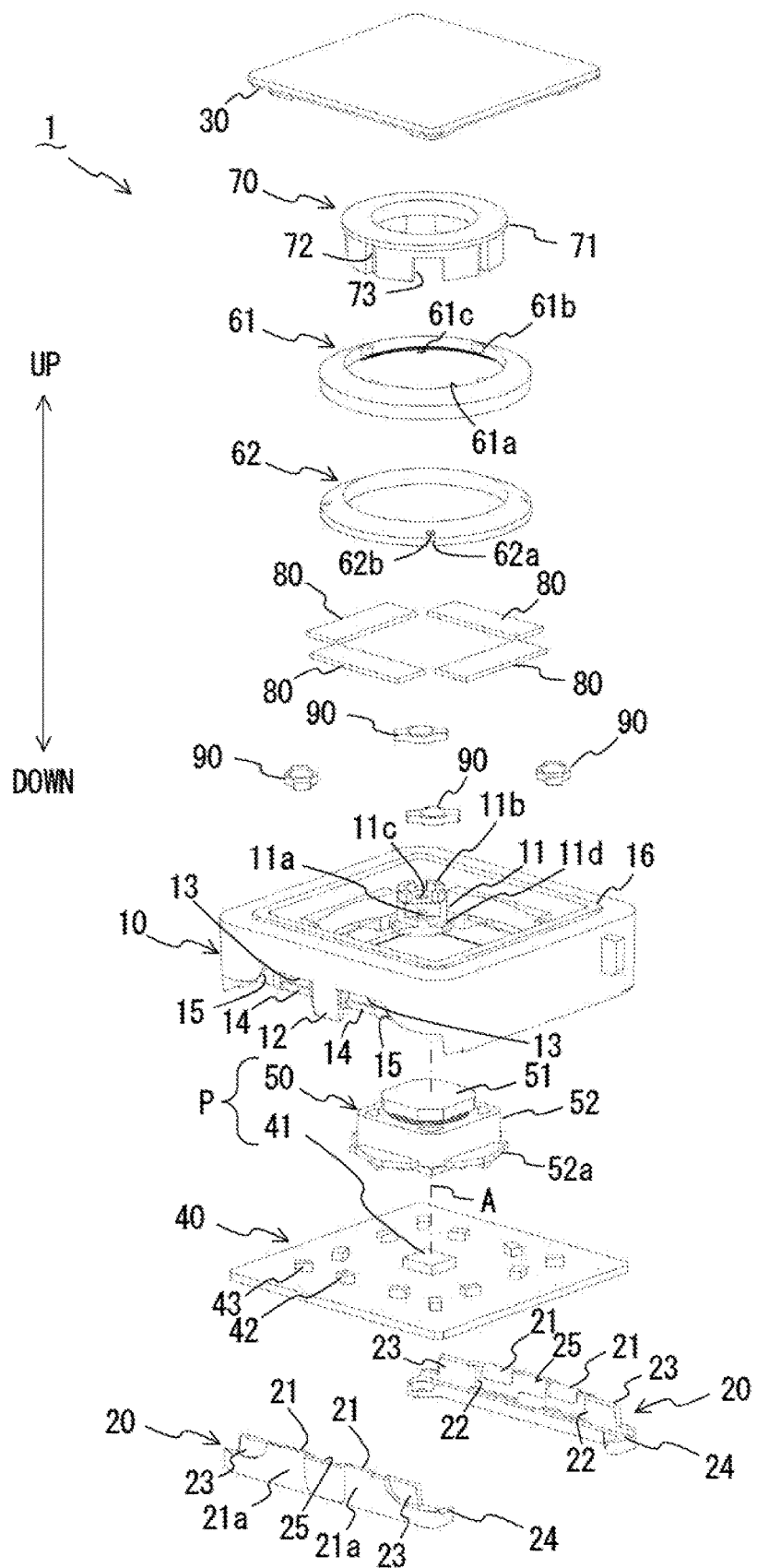
FIG. 3 is an exploded perspective view illustrating an imaging apparatus in accordance with embodiments.

FIG. 1 is a plan view illustrating the imaging apparatus 1 in accordance with embodiments.
FIG. 2 is a II-II cross-sectional view of FIG. 1.
FIG. 3 is an exploded perspective view illustrating the imaging apparatus 1.

As depicted in FIGS. 2 and 3, the imaging apparatus 1 includes a housing 10, two stoppers 20, a top cover 30, a wiring board 40, a lens module 50, a first light guide body 61, a second light guide body 62, a light blocking body 70, four polarization members 80, and four ranging lenses 90.

The imaging apparatus 1 is used as a biometrics authentication apparatus that performs authentication by capturing an image of a palm vein or as a component of the biometrics authentication apparatus. However, the imaging apparatus 1 may be one that captures an image of another type of biological information such as finger veins, fingerprints, or pupil irises or may be one that captures an image of a subject that is not biological information.

With reference to embodiments, an up-down direction is described with an exemplary state wherein a subject is located above the imaging apparatus 1.

As depicted in FIG. 3, the housing 10 is a frame-shaped housing that includes an opening in the direction of an optical axis A of an imaging unit P provided with the lens module 50 and the imaging element 41. For example, the housing 10 may have a rectangular frame shape (rectangular hollow shape) provided on the outer edges of the wiring board 40, which has a rectangular plate shape, in such a manner as to surround the imaging unit P, the first light guide body 61, the second light guide body 62, the light blocking body 70, and the like.

The housing 10 includes four bulging sections 11, two protruding sections 12, four stopper-lug-section accommodation sections 13, four housing lug sections 14, four fit-section accommodation sections 15, and a top-cover support section 16.

The four bulging sections 11 are provided at four corners of the housing 10. As depicted in FIG. 2, the bulging sections 11 bulge toward the lens module 50 without being in contact the wiring board 40. The bulging section 11 has a bottom surface on which a ranging-light-emitting-element reception recess 11e (this recess will be described hereinafter) is provided, and a space G1 is provided in the up-down direction between the wiring board 40 and portions of the bulging section 11 excluding the ranging-light-emitting-element reception recess 11e (e.g., the free edge consisting of the leading edge on the lens-module side).

As depicted in FIG. 3, the bulging section 11 includes an engagement projection 11a, four press-fit projection 11b, a through hole 11c, two polarization-member support sections 11d, and the ranging-light-emitting-element reception recess 11e (see FIG. 2).

The engagement projection 11a protrudes upward from the bulging section 11 and engages an engagement recess 62a in the second light guide body 62. The second light guide body 62 is placed on the bulging section 11 with the engagement projection 11a and the engagement recess 62b engaging each other. For example, the housing 10 may support the second light guide body 62 on the upper edges of the engagement projections 11a, as depicted in FIG. 2.

The four press-fit projections 11b depicted in FIG. 3 are formed to protrude upward from the bulging section 11. The ranging lens 90 is press-fitted into a region surrounded by the four press-fit projections 11b.

The through hole 11c is formed at a center between the four press-fit projections 11b and extends in the up-down direction through the bulging section 11. The through hole 11c is located above a ranging light emitting element 43 mounted on the wiring board 40. Light emitted from the ranging light emitting element 43 travels through the through hole 11c to the ranging lens 90.

As the through hole 11c is formed in the bulging section 11, the bulging section 11 functions as an aperture that limits the range of diffusion of light emitted from the ranging light emitting element 43. Thus, the housing 10 may be considered to be integral with four apertures.

The two polarization-member support sections 11d each protrude toward a different bulging section 11 (a bulging section 11 at an adjacent corner in the housing 10) so as to support a corner of a different polarization member 80.

The ranging-light-emitting-element reception recess 11e depicted in FIG. 2 is formed as an opening on the bottom surface of the bulging section 11 so as to avoid interference with the ranging light emitting element 43.

As depicted in FIG. 3, the two protruding sections 12 are provided at the centers of two opposite edges of the four edges of the housing 10 as seen in a plan view, i.e., provided on the outer side surface of the housing 10. The protruding sections 12 protrude downward.

Four stopper-lug-section accommodation sections 13 are provided on the outer side surface of the housing 10 in a manner such that two of these sections sandwich a protruding section 12 on each of two opposite edges of the four edges of the housing 10 as seen in a plan view. The stopper-lug-section accommodation sections 13 include openings in the outer side surface and the bottom surface of the housing 10 and accommodate stopper lug sections 21 of the stoppers 20.

The four housing lug sections 14 protrude from inside the stopper-lug-section accommodation sections 13 toward the outer side surface (toward opposite sides from the lens module 50) and engage the stopper lug sections 21 of the stopper 20. The housing lug sections 14 are inserted into housing-lug-section reception recesses 22 in the stoppers 20.

Four fit-section accommodation sections 15 are provided on the outer side surface of the housing 10 in a manner such that two of these sections sandwich two stopper-lug-section accommodation sections 13 on each of two opposite edges of the four edges of the housing 10 as seen in a plan view. The fit-section accommodation sections 15 include openings on the bottom-surface side of the housing 10. Fit sections 23 of the stoppers 20 are inserted into the fit-section accommodation sections 15 from below.

The top-cover support section 16 extends along the entirety of the upper face of the housing 10 and protrudes upward to support the top cover 30.

The two stoppers 20 depicted in FIG. 3 each include two stopper lug sections 21, two housing-lug-section reception recesses 22, two fit sections 23, a board pressing section 24, and a protruding-section reception recess 25. The outer edges of the wiring board 40 are sandwiched between the stoppers 20 and the housing 10 so as to fix the wiring board 40 to the housing 10.

The two stoppers 20 are such that one of the stoppers 20 is disposed on each of two opposite faces among the front, rear, left, and right faces constituting the outer side surface of the housing 10, i.e., two stoppers 20, in total, are disposed on two opposite edges of the wiring board 40. The stoppers 20 form portions of the outer side surface of the imaging apparatus 1 on the bottom side. Thus, the housing 10 and the stoppers 20 form the outer side surface of the imaging apparatus 1. The stoppers 20 are inserted from the bottom-surface side of the housing 10.

The stopper lug sections 21 engage the housing lug sections 14 of the housing 10 by being inserted into the stopper-lug-section accommodation sections 13 of the housing 10. In this way, the stoppers 20 are fixed to the housing 10. Outer side surfaces 21a of the stopper lug sections 21 are flush with the outer side surface of the housing 10.

The housing-lug-section reception recess 22 is formed as an opening on the inner-side-surface side of the stopper 20, i.e., as an opening on the inside of the housing 10 (lens-module-50 side). The housing lug section 14 is inserted into the housing-lug-section reception recess 22, as described above.

The fit sections 23 are provided at two end portions sandwiching the two housing-lug-section reception recesses 22. For example, the fit sections 23 may assume a plate shape and be inserted into the fit-section accommodation sections 15 from below, as described above.

The board pressing section 24 is positioned to press an outer edge of the wiring board 40, and this outer edge of the wiring board 40 is sandwiched between the board pressing section 24 and the housing 10. For example, the board pressing section 24 may be provided on the entirety of the longitudinal area in the stopper 20 and press the entirety of one edge of the wiring board 40, i.e., press an outer edge of the back surface of the wiring board 40. The board pressing section 24 presses two adjacent corners of the wiring board 40 in a manner such that the wiring board 40 is sandwiched between the board pressing section 24 and two adjacent corners of the housing 10.

As with the housing-lug-section reception recess 22, the protruding-section reception recess 25 is formed as an opening on the inner-side-surface side of the stopper 20, i.e., as an opening on the inside of the housing 10 (lens-module- 50 side). The protruding section 12 is inserted into the protruding-section reception recess 25.

The top cover 30 is supported by the top-cover support section 16 of the housing 10, as described above. For example, the top cover 30 may assume a square plate shape. The top cover 30 is formed from a translucent material. Emitted light from illumination light emitting elements 42 and the ranging light emitting elements 43 toward a subject (e.g., palm vein) and reflected light from the subject and the like pass through the top cover 30.

Mounting a component such as a CPU or a memory on the wiring board 40 allows the wiring board 40 to function as a controller for image capturing. When the imaging apparatus 1 is used as a biometrics authentication apparatus, the wiring board 40 may function as a controller for biometrics authentication.

The wiring board 40 includes an imaging element 41, eight illumination light emitting elements 42, and four ranging light emitting elements 43.

For example, the imaging element 41 may be an image sensor such as a complementary metal oxide semiconductor sensor (CMOS) and mounted at the center of the upper surface of the wiring board 40.

The eight illumination light emitting elements 42 are mounted on the upper surface of the wiring board 40 in a manner such that these elements surround and are equally spaced apart from the imaging element 41 and are arranged at equal intervals. The illumination light emitting element 42 is an example of the light source that emits light to travel to the outside through the top cover 30. For example, the illumination light emitting element 42 may be a light emitting diode (LED).

The four ranging light emitting elements 43 are mounted on the upper surface of the wiring board 40 in a manner such that these elements are located outward of the illumination light emitting elements 42, equally spaced apart from the imaging element 41, and arranged at equal intervals. The ranging light emitting element 43 emits light to travel to the outside through the through hole 11c in the bulging section 11, the ranging lens 90, and the top cover 30. For example, the ranging light emitting element 43 may be a LED.

The imaging unit P includes the lens module 50 and the imaging element 41 mounted on the wiring board 40. The imaging unit P is positioned such that the optical axis A extends via the centers of the housing 10 and the wiring board 40.

The lens module 50 includes a lens body 51 and a lens supporting member 52 and positioned at the center of the upper surface of the wiring board 40. For example, the lens supporting member 52 (lens module 50) may be fixed to the upper surface of the wiring board 40.

The lens body 51 focuses light on the imaging element 41. A space G2 is provided in the up-down direction between an upper surface of the lens body 51 (lens module 50) and a bottom surface of the top cover 30.

The lens supporting member 52 assumes a rectangular-frame shape surrounding a lower portion of the lens body 51 and supports the lens body 51. As depicted in FIG. 3, a blocking section 52a assuming an essentially triangular shape when seen in a plan view projects outward from each of the four edges of the lens supporting member 52 as seen in a plan view.

When seen in a plan view, each of the four blocking sections 52a projects toward two of the eight illumination light emitting elements 42. The blocking sections 52a block stray light from the illumination light emitting elements 42. As an example, the stray light may be light that is emitted from an illumination light emitting element 42 and then reflected from the wiring board 40 and the light blocking body 70 and finally proceeds toward the lens body 51. The four blocking sections 52a support the polarization members 80 together with the above-described polarization-member support sections 11d. The blocking section 52a supports a longer edge portion of the polarization member 80 from below.

As depicted in FIG. 3, the first light guide body 61 and the second light guide body 62 have an annular shape and are placed over each other such that the first light guide body 61 is located over the second light guide body 62. The first light guide body 61 and the second light guide body 62 are examples of light guide bodies that surround the lens module 50 and guide light emitted from the illumination light emitting elements 42. Only a single light guide body may be provided, rather than the two light guide bodies, i.e., the first light guide body 61 and the second light guide body 62.

The first light guide body 61 and the second light guide body 62 diffuse light emitted from the illumination light emitting elements 42 in a manner such that no light proceeds to the lens body 51. The upper surfaces of the first light guide body 60 and the second light guide are each inclined downward from the inner side surface (inner circumferential edge 61a) of the body to the outer boundary.

The first light guide body 61 supports a flange section 71 of the light blocking body 70 on the inner circumferential edge 61a (the flange section 71 will be described hereinafter). The first light guide body 61 includes four rotation-prevention projections 61b to be inserted into four rotation-prevention recesses 72 provided at equal intervals on the outer side surface of the light blocking body 70. Accordingly, relative rotation of the first light guide body 61 and the light blocking body 70 is prevented from occurring. The rotation-prevention projection 61b is located below the inner circumferential edge 61a. Thus, there is a space in the up-down direction between the upper surface of the rotation-prevention projection 61b and the bottom surface of the flange section 71, and the upper surface of the rotation-prevention projection 61b is not in contact with the bottom surface of the flange section 71 (is not in contact with the light blocking body 70).

Four engagement projections 61c protruding downward are provided at equal intervals on the bottom surface of the first light guide body 61. The four engagement projections 61c engage the four engagement recesses 62b in the second light guide body 62. Accordingly, relative rotation of the first light guide body 61 and the second light guide body 62 is prevented from occurring. Although not illustrated, the first light guide body 61 is provided with prism columns that include a multitude of ridges arranged in the radial direction of the first light guide body 61.

As described above, the second light guide body 62 is provided with the four engagement recesses 62a to engage the engagement projections 11a of the four bulging sections 11 of the housing 10. Accordingly, the second light guide body 62 is supported by the four engagement projections 11a (four bulging sections 11).

As depicted in FIG. 3, the light blocking body 70 assumes a cylindrical shape, surrounds the lens body 51 (lens module 50), and blocks light such as the abovementioned stray light from the illumination light emitting elements 42. The flange section 71 protrudes outward from the entirety of the outer boundary of the upper edge of the light blocking body 70. The light blocking body 70 is inserted from above into the inside of the first light guide body 61, and the flange 71 is placed on the inner circumferential edge 61a of the first light blocking body 61.

As described above, relative rotation of the light blocking body 70 and the first light guide body 61 is prevented from occurring by the rotation-prevention projections 61b being inserted into the rotation-prevention recesses 72. The light blocking body 70 and the first light guide body 61 are placed over each other such that these bodies are in contact with each other at the portions different from the rotation-prevention projections 61b (at the inner side surface 61a and the bottom surface of the flange section 71).

In embodiments, the first light guide body 61 is provided with the rotation-prevention projections 61b, and the light blocking body 70 is provided with the rotation-prevention recesses 72. However, the first light guide body 61 may be provided with rotation-prevention recesses, and the light blocking body 70 may be provided with rotation-prevention projections.

In embodiments, the first light guide body 61 is located under the light blocking body 70. However, the light blocking body 70 may be located under the first light guide body 61 as long as the first light guide body 61 is placed over the light blocking body 70 such that these bodies are in contact with each other at portions different from the rotation-prevention projections of the first light guide body 61 or light blocking body 70.

A lower portion of the light blocking body 70 is provided with four lens-supporting-member reception notches 73 arranged at equal intervals to prevent an occurrence of interference with the four corners of the lens supporting member 52 as seen in a plan view.

The upper surface of the light blocking body 70 may be slightly spaced apart from, or may be in contact with, the bottom surface of the top cover 30. A space G2 larger than a space (if any) between the upper surface of the light blocking body 70 and the bottom surface of the top cover 30 is provided between the upper surface of the lens module 50 and the bottom surface of the top cover 30. Accordingly, when the top cover 30 warps downward due to the center thereof being pressed as will be described hereinafter downward by a finger or a palm, the bottom surface of the top cover 30 comes into contact with the upper surface of the light blocking body 70 without being in contact with the upper surface of the lens module 50.

As described above, the four polarization members 80 are each supported by a single blocking section 52a of the lens module 50 and two polarization-member support sections 11d of two adjacent bulging sections 11. The polarization member 80 is located above two illumination light emitting elements 42 and below the second light guide body 62 and allows light with a certain wavelength among the light emitted from the illumination light emitting elements 42 to pass therethrough.

As depicted in FIG. 2, a load L1 is applied downward to the top cover 30 of the imaging apparatus 1 by the center of the top cover 30 being pressed downward by a finger, a palm, or the like. As a result, the top cover 30 warps, and a load L2 is applied to the light blocking body 70.

A load L3 is also applied to the first light guide body 61 that includes the inner circumferential edge 61a in contact with the bottom surface of the flange section 71 of the light blocking body 70. A load L4 is applied to the second light guide body 62 that includes the engagement recesses 62b engaging the engagement projections 61c of the first light guide body 61.

A load L5 is applied to the bulging sections 11 that include the engagement projections 11a engaging the engagement recesses 62a in the second light guide body 62. The gap G1 is provided as described above between the bulging sections 11 and the wiring board 40, and thus the load L5 applied to the bulging sections 11 is applied as a load L6 to the outer edges (corners) of the wiring board 40 and to the board pressing sections 24 of the stoppers 20 that sandwich the outer edges of the wiring board 40 in cooperation with the housing 10. Accordingly, since the load L6 applied to the wiring board 40 is applied to the outer edges of the wiring board 40 sandwiched by the board pressing sections 24, warping (distortion) of wiring board 40 is reduced.

In the embodiments described above, the imaging apparatus 1 includes: the wiring board 40; the imaging unit P that includes the lens module 50 and the imaging element 41 mounted on the wiring board 40; the housing 10 that assumes a frame shape and includes an opening in the direction of the optical axis A of the imaging unit P; the top cover 30 placed over the housing 10; the illumination light emitting elements 42, which are examples of the light source that emits light to travel to the outside through the top cover 30; and the first light guide body 61 and the second light guide body 62, which are examples of the light guide body that surrounds the lens module 50 and guides the light emitted from the illumination light emitting elements 42. The imaging unit P is spaced apart from the top cover 30 by the space G2. The housing 10 includes the bulging sections 11 bulging toward the lens module 50 without being in contact with the wiring board 40 (space G1). The bulging sections 11 receive the load L5 applied from the top cover 3 via at least the light guide body (first light guide body 61 and second light guide body 62).

Accordingly, when the center of the top cover 30 is pressed downward by a finger, a palm, or the like, the load L1 can be transferred to the bulging sections 11 via the first light guide body 61 and the second light guide body 62 without passing via the imaging unit P. Since the bulging sections 11 bulge toward the lens module 50 without being in contact the wiring board 40 (space G1), the load L5 applied to the bulging sections 11 is applied to the outer edges (corners) of the wiring board 40 as the load L6. Thus, warping of the wiring board 40 is reduced. Accordingly, the possibility of the components mounted on the wiring board 40 being broken can be prevented from occurring owing to warping of the wiring board 40, unlike in a configuration in which a load is applied to the wiring board 40 via the imaging unit P without passing via the bulging sections 11 or a configuration in which a load is applied to the wiring board 40 via the first light guide body 61 and the second light guide body 62 without passing via the bulging sections 11. In addition, with the simple configuration in which the housing 10 is provided with the bulging sections 11, the possibility of the components mounted on the wiring board 40 being broken can be prevented from occurring, as described above.

Therefore, embodiments allow the durability of the wiring board 40 and ultimately that of the imaging apparatus 1 to be enhanced by means of simple configurations.

In embodiments, the imaging apparatus 1 further includes the light blocking body 70 that surrounds the lens module 50 and blocks light, and the bulging sections 11 receive the load L5 applied from the top cover 30 via at least the light blocking body 70 and the light guide body (first light guide body 61 and second light guide body 62). Thus, the load L1 applied downward to the vicinity of the center of the top cover 30 (the vicinity of the lens module 50) via the light blocking body 70 and the light guide body (first light guide body 61 and second light guide body 62) that surround the lens module 50 can be transferred to the bulging sections 11. Accordingly, the durability of the wiring board 40 and ultimately that of the imaging apparatus 1 can be enhanced by means of the simple configuration.

In embodiments, the imaging apparatus 1 further includes the light blocking body 70 that surrounds the lens module 50 and blocks light; one (first light guide body 61) of the light guide body (first light guide body 61 and second light guide body 62) or the light blocking body 70 includes the rotation-prevention projections 61*b*, and the other (light blocking body 70) includes the rotation-prevention recesses 72 that engage the rotation-prevention projections 62; and the light guide body (first light guide body 61 and second light guide body 62) and the light blocking body 70 are placed over each other such that these bodies are in contact with each other at portions different from the rotation-prevention projections 61*b* (e.g., at the inner circumferential edge 61*a* of the first light guide body 61 and the bottom surface of the flange section 71). Thus, the rotation-prevention projections 61*b* can be prevented from being broken due to a shock that could be generated if the imaging apparatus 1 is dropped or due to the load L3 that could be applied from the top cover 30 to the rotation-prevention projections 61*b*. Accordingly, the durability of the imaging apparatus 1 can be enhanced to a greater degree.

The present invention is not simply limited to the embodiments described herein. Components of the embodiments may be embodied in a varied manner in an implementation phase without departing from the gist of the invention. A plurality of components disclosed with reference to the described embodiments may be combined, as appropriate, to achieve various inventions. For example, all of the components indicated with reference to embodiments may be combined as appropriate. Accordingly, various variations and applications can be provided without departing from the gist of the invention.

The invention claimed is:

1. An imaging apparatus comprising:
    a wiring board;
    an imaging unit that includes a lens module and an imaging element mounted on the wiring board;
    a housing that assumes a frame shape and includes an opening in an optical-axis direction of the imaging unit;
    a top cover placed over the housing;
    a light source that emits light to travel to an outside through the top cover;
    a light guide body that surrounds the lens module and guides the light emitted from the light source; and
    a light blocking body that surrounds the lens module and blocks light, wherein
    the imaging unit is spaced apart from the top cover by a space,
    the housing includes a bulging section bulging toward the lens module without being in contact the wiring board, and
    the bulging section receives a load applied from the top cover via at least the light blocking body and the light guide body.

2. An imaging apparatus comprising:
    a wiring board,
    an imaging unit that includes a lens module and an imaging element mounted on the wiring board;
    a housing that assumes a frame shape and includes an opening in an optical-axis direction of the imaging unit;
    a top cover placed over the housing;
    a light source that emits light to travel to an outside though the top cover;
    a light guide body that surrounds the lens module and guides the light emitted from the light source; and
    a light blocking body that surrounds the lens module and blocks light, wherein
    the imaging unit is spaced apart from the top cover by a space,
    the housing includes a bulging section bulging toward the lens module without being in contact the wiring board,
    the bulging section receives a load applied from the top cover via at least the light guide body,
    one of the light guide body and the light blocking body includes a rotation-prevention projection, and the other includes a rotation-prevention recess that engages the rotation-prevention projection, and
    the light guide body and the light blocking body are placed over each other such that these bodies are in contact with each other at portions different from the rotation-prevention projection.

* * * * *